Feb. 24, 1931.  F. O. VAUGHN  1,793,571
VARIABLE SPEED DRIVE
Filed Dec. 14, 1929   2 Sheets-Sheet 1

Inventor
Frank O. Vaughn
By his Attorney
John J. Thompson

Feb. 24, 1931. F. O. VAUGHN 1,793,571
VARIABLE SPEED DRIVE
Filed Dec. 14, 1929 2 Sheets-Sheet 2

Inventor
Frank O. Vaughn
By his Attorney
John J. Thompson

Patented Feb. 24, 1931

1,793,571

UNITED STATES PATENT OFFICE

FRANK O. VAUGHN, OF POUGHKEEPSIE, NEW YORK

VARIABLE-SPEED DRIVE

Application filed December 14, 1929. Serial No. 413,963.

This invention relates to a variable speed drive and in which the power transmitting means comprises two semi-spherical friction cones in running contact with each other and adapted to be so adjusted as to vary the speed transmitted and also capable of being reversed.

The object of the invention is to provide a variable speed drive capable of transmitting all speeds within its range from low to high and also reverse.

Another object of the invention is to construct a device of this kind that shall be durable, simple, contain few parts and be adaptable to many uses where a light variable speed drive is desired.

A further object is to provide means whereby the wearing parts may be readily renewed without having to dissemble the entire machine.

Still another object is to provide means whereby the ratio of speed may be changed during the operation of the device, and any desired ratio locked from accidental change, and also a reverse direction of rotation obtained in the same manner.

Also a novel means is provided not only for the adjustment of the frictional contact between the cones, but for an automatic adjustment whereby the amount of contact or pressure is increased as the power is increased so that any slip is eliminated.

With these and other objects in view, my invention consists in certain construction and combination of parts as will hereinafter be fully described and claimed and illustrated in the accompanying drawings, in which like figures of reference refer to corresponding parts in all of the views, but it is fully understood that slight changes may be made without departing from the spirit of the invention.

In the drawings:—

Referring to the drawings:—

Figures 1, 2:
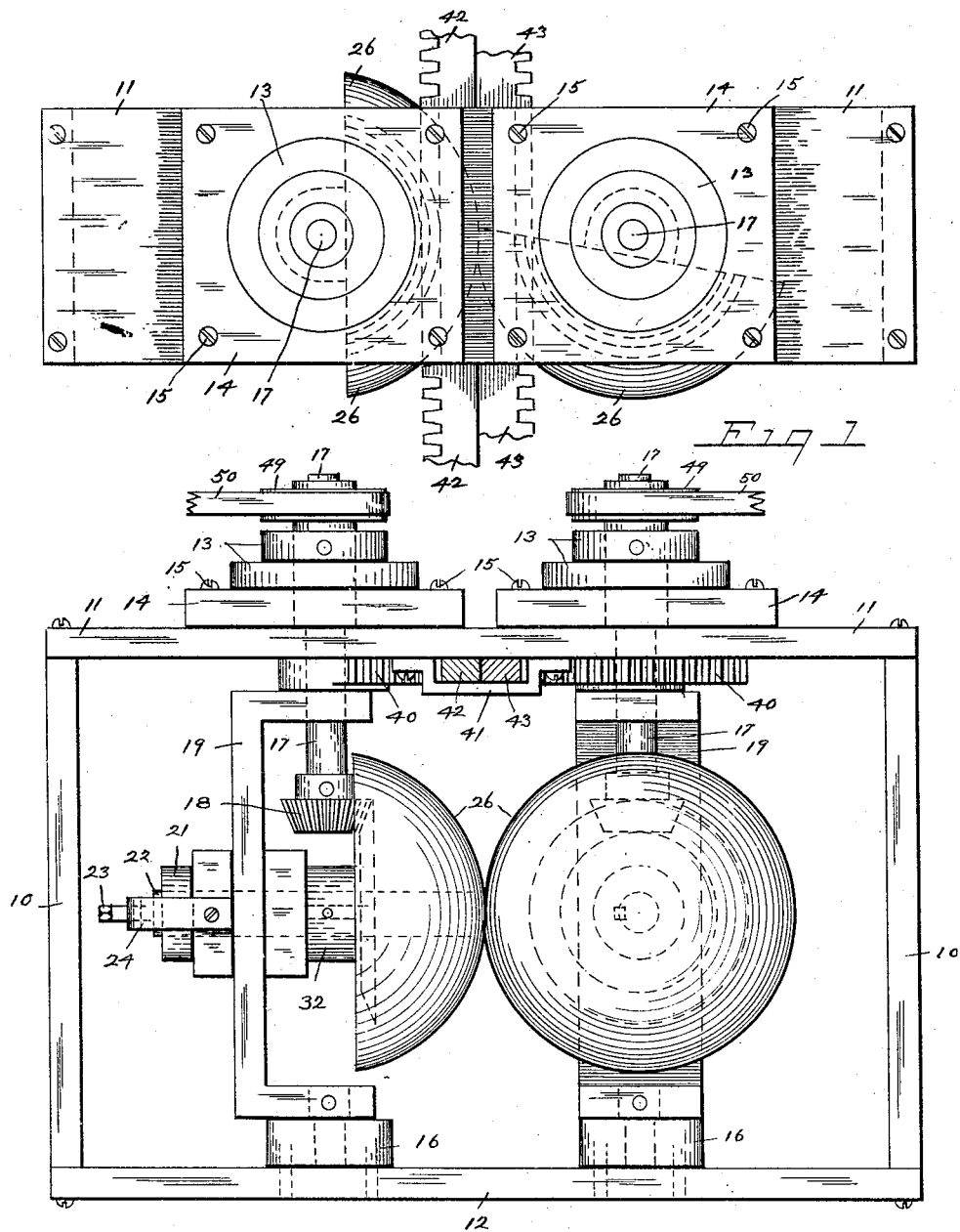
Figure 1 is a top plan view of a frictional variable speed drive in which my design is shown.
Figure 2 is a side elevation of the same, with the cones in one of their extreme positions.

The device is here shown as mounted in a rectangular frame, but this frame may be of any desired shape and size depending upon the use to which the drive is to be put and the mounting of the same.

As herewith shown, said frame comprises a top 11, bottom 12 and sides 10; the top being provided with the ball or roller bearings 13 mounted in the bearing blocks 14 attached to said top 11 by the screws 15 or other suitable means.

The bottom 12 is also provided with ball or roller bearings 16 attached thereto in alined relation to the bearings in the top 11; and in the upper bearings 13 are rotatably mounted the shafts 17, upon the lower ends of which are secured the bevel gear pinions 18.

Two C-shaped swinging brackets 19 are provided, and secured to and projecting from their lower ends are the studs 20 which are mounted in the lower bearings 16; while the upper arms of said brackets 19 are formed with bores through which the shafts 17 pass, so that said brackets may be swung upon said shafts and the studs 20.

At right angles to each stud 20 and the shaft 17 in each of said brackets 19 is provided a ball or roller bearing 21 within which is mounted a shaft 22; said shaft 22 having a limited sliding movement within said bearing 21 and a free rotating movement therein; the end of said shaft 22 projecting from the bearing 21 and in contact with an adjusting screw 23 which is threaded in a yoke 24 attached to the bearing 21 by the screws 25, or a stiff spring may be employed to normally press inward on said shaft 22.

On the inner end of said shafts 22 are secured the semi-circular contact members 47, which are faced with the removable contact surface material 26 of leather or other suitable material and which is secured thereon in any suitable manner such as by pins, screws, etc.

Figures 3, 4:
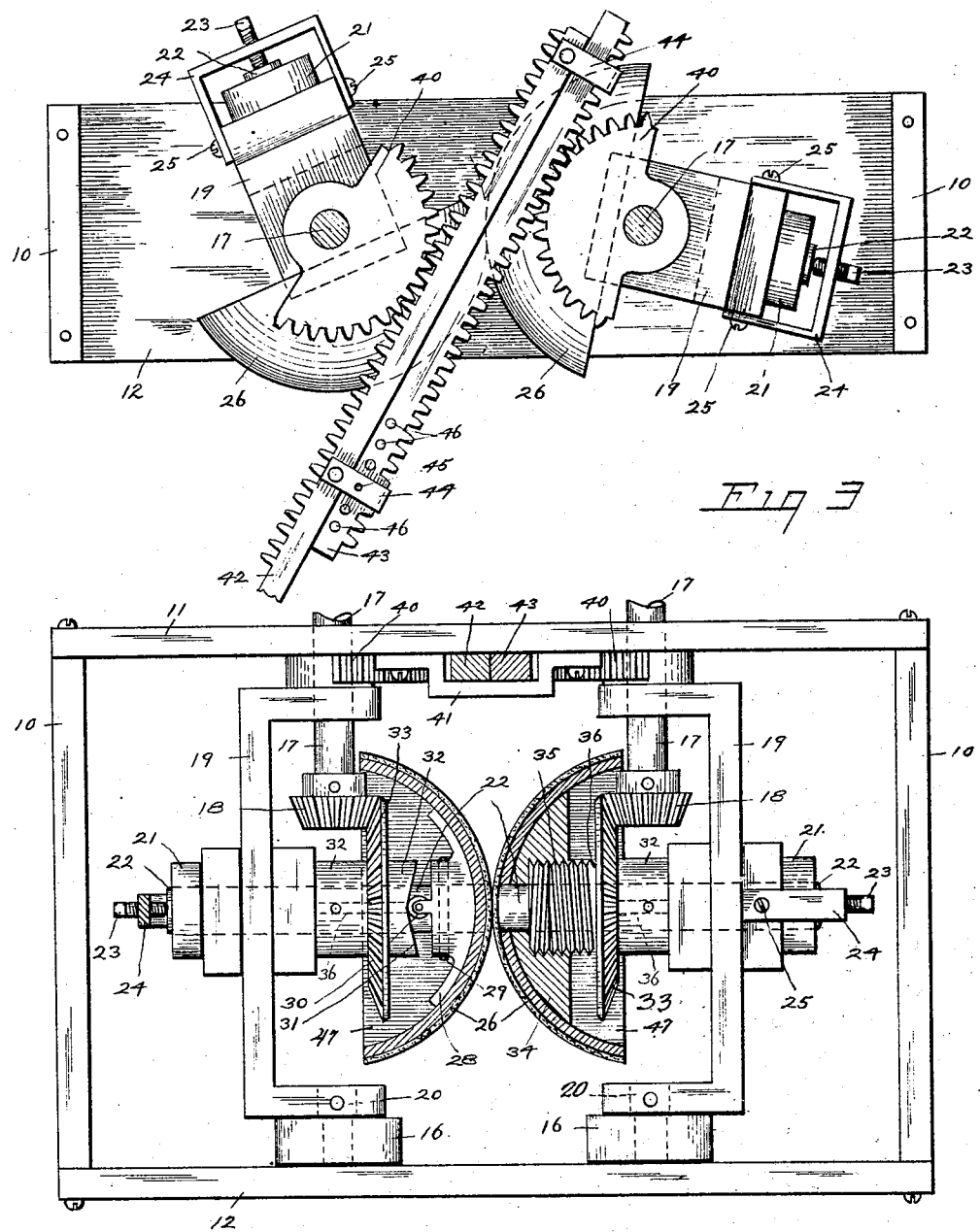
Figure 3 is a partial sectional top plan view, showing the method of speed adjustment and the reversing device.
Figure 4 is a side elevation, showing the cones in a neutral position, and showing some of the parts in section to illustrate the automatic tension device.

Two methods are shown for automatically retaining the friction cones in driving contact and increasing the pressure in proportion to the load or work, and these two methods are illustrated in Figure 4 of the drawings, and that shown on the left hand cone will be described first, and comprises a member 28 secured to the inner face of the cone 47 or integral therewith and formed with a bore within which is secured the end of the shaft 22 by the pin 29; the outer end of said member 28 being formed with one or more beveled rollers 30 adapted to engage with and ride on the inclined end 31 formed on the hub 32 of the bevel gear 33 which is slideably mounted on the shaft 22 in mesh with the pinion 18, and in such a manner that as the cone 47 is rotated in either direction by the other cone in contact therewith, the two beveled surfaces of the end 31 and roller 30 will coact as a wedge to force the cone 47 into close contact with the other cone; this automatic adjustment being in addition to the adjustment of the shaft 22 by the screw 23 bearing against its outer end.

In the method shown in the right hand cone in Figure 4, a member 34 is secured to, or is a part of the cone 47 and this member is formed with a threaded bore 35, while the hub 36 of the bevel gear 33 is formed with external threads coacting with those in the member 34 to force the cone outward as the same is rotated, but in the use of this method when the device is reversed the entire adjustment will have to be made by the left hand cone as the right hand cone will only expand in one direction. In both methods the bevel gear 33 is mounted on a spline 36 in the shaft 22.

For operating the swinging brackets 19 to regulate and adjust the variable contact of the cones there is provided a pair of gear segments 40 secured to hubs on the brackets 19 of the shafts 17 below the top 11, and mounted in guides 41 secured to said top 11 are a pair of rack arms 42 and 43 which are mounted back to back with their teeth in engagement with the teeth of said gear segments 40; said racks being placed at any desired angle as shown, depending upon the size of the gear segments 40 and the width of the racks 42 and 43.

The rack 43 is shorter and is adapted to slide on and in relation to the rack 42, being mounted to the same by the guides 44 and held in position by some suitable means such as a pin 45 in the holes 46; this rack being designed to operate one of the cones to bring the same past the center of the other cone to impart reverse movement to the drive.

It is to be understood that the shafts 17 may be supplied with any means for transmitting the power to and from the device such as pulleys and belts.

Having thus described my invention, what I claim as new and desire to secure by Letters Patent, is:—

1. In a variable speed drive of the class described comprising in combination with a main frame two brackets mounted therein, vertical and horizontal shafts rotatably mounted in said brackets, pinion gears secured on said vertical shafts, bevel gears mounted on said horizontal shafts in mesh therewith, a pair of frictional members secured on said horizontal shafts in contact with each other, means carried thereby and by said bevel gears for adjusting the frictional contact of said frictional members during their operation in an automatic manner, means for adjusting the line of contact of said members to vary the ratio of speed between the same, and means for operating said adjusting means to relocate one of said frictional members to reverse its direction of rotation.

2. In a variable speed drive of the class described, and in combination with a drive shaft and a driven shaft, means for varying the speed of said shafts comprising a pair of frictional members mounted in contact with each other, means for rotating one of said members from the drive shaft and means for rotating the driven shaft by the other member, means for varying the line of contact and thus the ratio of speed between said frictional members comprising a pair of gear segments adapted to swing said frictional members, a pair of operating racks in engagement with said gear segments for moving the same, and an adjusting means between said racks to vary the position of said gear segments with each other, and means for automatically exerting pressure upon said frictional members to retain them in frictional contact with each other.

In testimony whereof I affix my signature.

FRANK O. VAUGHN.